United States Patent
Yoshida

(10) Patent No.: US 8,441,552 B2
(45) Date of Patent: May 14, 2013

(54) PHOTOGRAPHING APPARATUS WITH IMPROVED WHITE BALANCE CORRECTION AND METHOD AND RECORDING MEDIUM

(75) Inventor: Takahiko Yoshida, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 125 days.

(21) Appl. No.: 12/977,550

(22) Filed: Dec. 23, 2010

(65) Prior Publication Data

US 2011/0157412 A1 Jun. 30, 2011

(30) Foreign Application Priority Data

Dec. 24, 2009 (JP) ................................ 2009-293475
Dec. 14, 2010 (KR) ........................ 10-2010-0127875

(51) Int. Cl.
*H04N 5/235* (2006.01)

(52) U.S. Cl.
USPC ................... 348/229.1; 348/223.1; 348/224.1

(58) Field of Classification Search ............... 348/229.1, 348/223.1
See application file for complete search history.

(56) References Cited

U.S. PATENT DOCUMENTS

| | | | | |
|---|---|---|---|---|
| 7,330,206 B2 * | 2/2008 | Nishimura | .................. | 348/223.1 |
| 2005/0099529 A1 * | 5/2005 | Hattori | ........................... | 348/370 |
| 2005/0244151 A1 * | 11/2005 | Fukui | ................................ | 396/48 |
| 2007/0248342 A1 * | 10/2007 | Tamminen et al. | ............. | 396/67 |
| 2008/0124067 A1 * | 5/2008 | Eliasson | ....................... | 396/108 |
| 2009/0033753 A1 * | 2/2009 | Sato et al. | .................. | 348/217.1 |
| 2009/0310013 A1 * | 12/2009 | Odaka | ........................... | 348/371 |

FOREIGN PATENT DOCUMENTS

| | | | |
|---|---|---|---|
| JP | 2002-369211 A | | 12/2002 |
| JP | 2005-167476 A | | 6/2005 |
| JP | 2005167476 A | * | 6/2005 |

* cited by examiner

*Primary Examiner* — Roberto Velez
*Assistant Examiner* — Cynthia Segura
(74) *Attorney, Agent, or Firm* — Drinker Biddle & Reath LLP

(57) ABSTRACT

A photographing apparatus and method and a recording medium, the photographing apparatus including: an exposure control value calculator for calculating a first exposure control value for a first image obtained by performing non-flash photographing and a second exposure control value for a second image by performing flash photographing based on light received from a subject; a photographing unit for acquiring the first image by performing photographing based on the first exposure control value and acquiring the second image by performing photographing based on the second exposure control value; an exposure control value difference calculator for calculating an exposure control value difference that is a difference between the first exposure control value and the second exposure control value; and a subject brightness calculator for calculating a first subject brightness of the first image and calculating a second subject brightness of the second image.

15 Claims, 9 Drawing Sheets

PHOTOGRAPHING APPARATUS WITH IMPROVED WHITE BALANCE CORRECTION AND METHOD AND RECORDING MEDIUM

CROSS-REFERENCE TO RELATED PATENT APPLICATION

This application claims the benefit of Japanese Patent Application No. 2009-293475, filed on Dec. 24, 2009, in the Japanese Patent Office, and Korean Patent Application No. 10-2010-0127875, filed on Dec. 14, 2010, in the Korean Intellectual Property Office, the disclosures of which are incorporated herein in their entirety by reference.

BACKGROUND

The invention relates to a photographing apparatus and method and a recording medium. In an electronic photographing apparatus, such as a digital still camera, a conventional white balance correction process is a process of uniformly applying a single white balance gain to an entire image. For example, in a scene with a low level of illumination (environment light), photographing is performed by emitting a flash to solve a lack of light-exposure. When photographing is performed by emitting a flash, a white balance gain is calculated according to a light intensity of the emitted flash. When a scene is captured by mixing environment light and flash light, a subject close to a digital still camera can be captured with a proper white balance. However, a subject far from the digital still camera depends on the environment light rather than the flash light. Thus, when a light source of the environment light is a fluorescent lamp, a color temperature difference between the environment light and the flash light is large. As a result, when a white balance correction process is applied to an entire image, a white subject far from the digital still camera becomes yellow, i.e., an improper white balance occurs.

SUMMARY

Various embodiments of the invention provide a photographing apparatus capable of properly white-balancing an entire flash image without performing unnecessary photographing by using a non-flash image as an image of appropriate exposure, a photographing method, and a recording medium.

According to an embodiment of the invention, a photographing apparatus is provided including: an exposure control value calculator for calculating a first exposure control value for a first image obtained by performing non-flash photographing and a second exposure control value for a second image by performing flash photographing based on light received from a subject; a photographing unit for acquiring the first image by performing photographing based on the first exposure control value and acquiring the second image by performing photographing based on the second exposure control value; an exposure control value difference calculator for calculating an exposure control value difference that is a difference between the first exposure control value and the second exposure control value; a subject brightness calculator for calculating a first subject brightness of the first image and calculating a second subject brightness of the second image; a subject brightness difference calculator for calculating a subject brightness difference by using the exposure control value difference, the first subject brightness, and the second subject brightness; a reflected flash amount calculator for calculating an amount of reflected flash from the subject brightness difference; and a white balance gain calculator for calculating a white balance gain from the amount of reflected flash.

The photographing apparatus may further include: a white balance controller for controlling a white balance in a pixel unit by applying the white balance gain to all pixels of the second image in a pixel unit.

The first exposure control value and the second exposure control value may be independently calculated by the exposure control value calculator and be identical to each other.

The first exposure control value and the second exposure control value may be independently calculated by the exposure control value calculator and be different from each other.

The photographing unit may acquire the second image by using the second exposure control value having the same iris value as an iris value of the first exposure control value calculated by the exposure control value calculator.

The photographing apparatus may further include: a color balance calculator for calculating a color balance of a target pixel by linearly-interpolating a color balance with respect to environment light and a color balance with respect to flash light based on the amount of reflected flash calculated by the reflected flash amount calculator, wherein the white balance gain calculator calculates the white balance gain based on the color balances.

The first exposure control value may be used to make brightness of the first image appropriate, and the second exposure control value may be used to make brightness of the second image appropriate.

The subject brightness calculator may calculate a first subject brightness for all pixels of the first image and calculate a second subject brightness for all pixels of the second image, and wherein the subject brightness difference calculator calculates a subject brightness difference that is a difference between the exposure control value difference, the first subject brightness per pixel, and the second subject brightness per pixel, for all pixels.

The reflected flash amount calculator may calculate the amount of reflected flash in a pixel unit from the subject brightness difference, and wherein the white balance gain calculator calculates the white balance gain in a pixel unit from the amount of reflected flash.

According to another embodiment of the invention, a photographing method is provided including: calculating a first exposure control value for a first image obtained by performing non-flash photographing and a second exposure control value for a second image by performing flash photographing based on light received from a subject; acquiring the first image by performing photographing based on the first exposure control value and acquiring the second image by performing photographing based on the second exposure control value; calculating an exposure control value difference that is a difference between the first exposure control value and the second exposure control value; calculating a first subject brightness of the first image and calculating a second subject brightness of the second image; calculating a subject brightness difference by using the exposure control value difference, the first subject brightness, and the second subject brightness; calculating an amount of reflected flash from the subject brightness difference; and calculating a white balance gain from the amount of reflected flash.

The photographing method may further include: controlling a white balance in a pixel unit by applying the white balance gain to all pixels of the second image in a pixel unit.

The calculating of the first subject brightness may include: calculating a first subject brightness for all pixels of the first image and calculating a second subject brightness for all pixels of the second image, and wherein the calculating of the subject brightness difference includes: calculating a subject brightness difference that is a difference between the exposure control value difference, the first subject brightness per pixel, and the second subject brightness per pixel, for all pixels.

The calculating of the amount of reflected flash may include: calculating the amount of reflected flash in a pixel unit from the subject brightness difference, and wherein the calculating of the white balance gain includes: calculating the white balance gain in a pixel unit from the amount of reflected flash.

The photographing method may further include: linearly-interpolating a color balance of environment light and a color balance of flash light based on the amount of reflected flash calculated by the reflected flash amount calculator; and calculating a color balance of a target pixel.

According to another embodiment of the invention, there is provided a computer readable recording medium storing a program for executing the photographing method.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Figure 1:
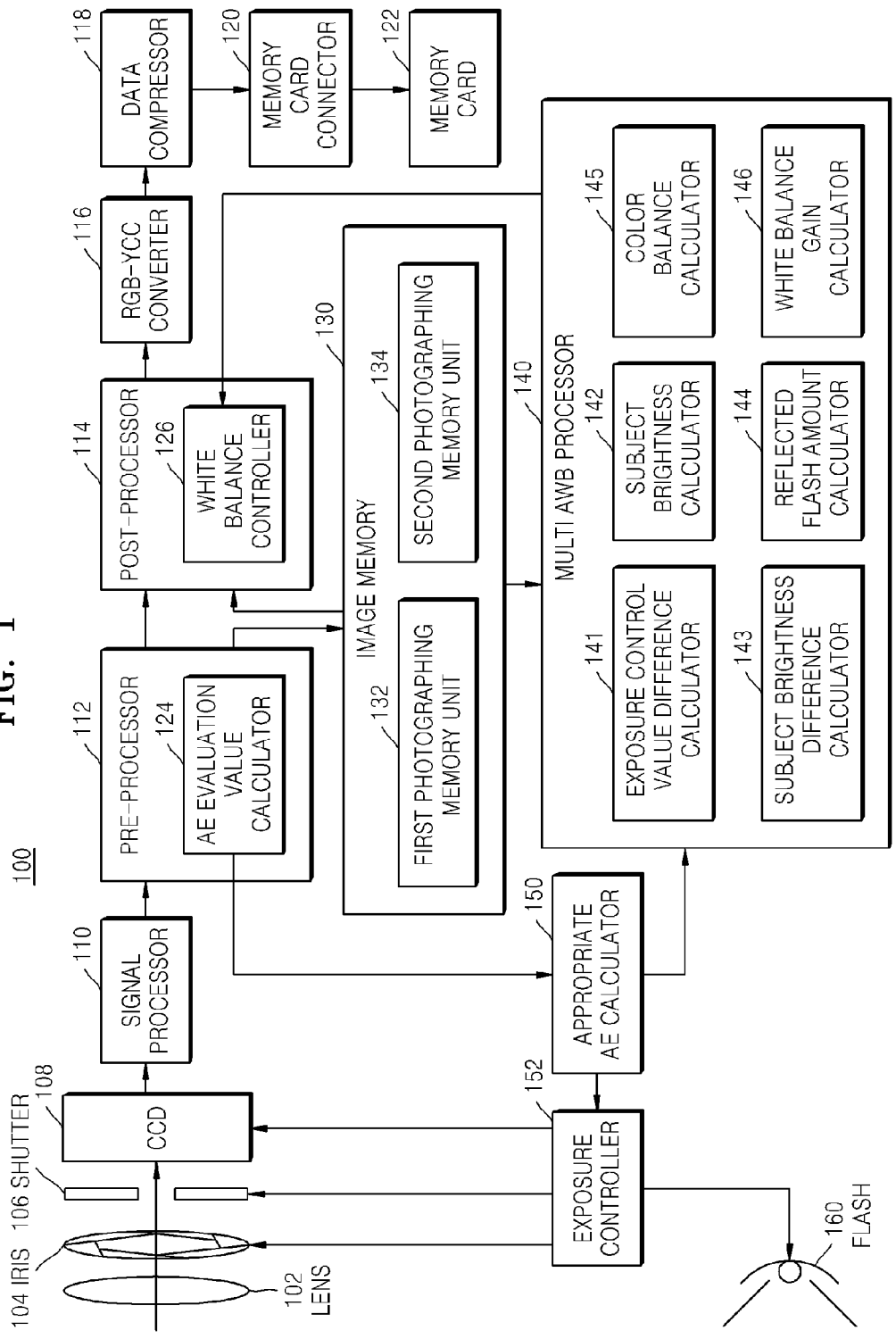
FIG. 1 is a block diagram of a photographing apparatus according to an exemplary embodiment of the invention.

As the invention allows for various changes and numerous embodiments, particular embodiments will be illustrated in the drawings and described in detail in the written description. However, this is not intended to limit the invention to particular modes of practice, and it is to be appreciated that all changes, equivalents, and substitutes that do not depart from the spirit and technical scope of the invention are encompassed in the invention. In the description of the invention, certain detailed explanations of related art are omitted when it is deemed that they may unnecessarily obscure the essence of the invention.

While such terms as "first," "second," etc., may be used to describe various components, such components must not be limited to the above terms. The above terms are used only to distinguish one component from another.

The terms used in the specification are merely used to describe particular embodiments, and are not intended to limit the invention. An expression used in the singular encompasses the expression of the plural, unless it has a clearly different meaning in the context. In the specification, it is to be understood that terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Embodiments of the invention will be described below in more detail with reference to the accompanying drawings. Those components that are the same or are in correspondence are rendered the same reference numeral regardless of the figure number, and redundant explanations are omitted.

Figure 2:
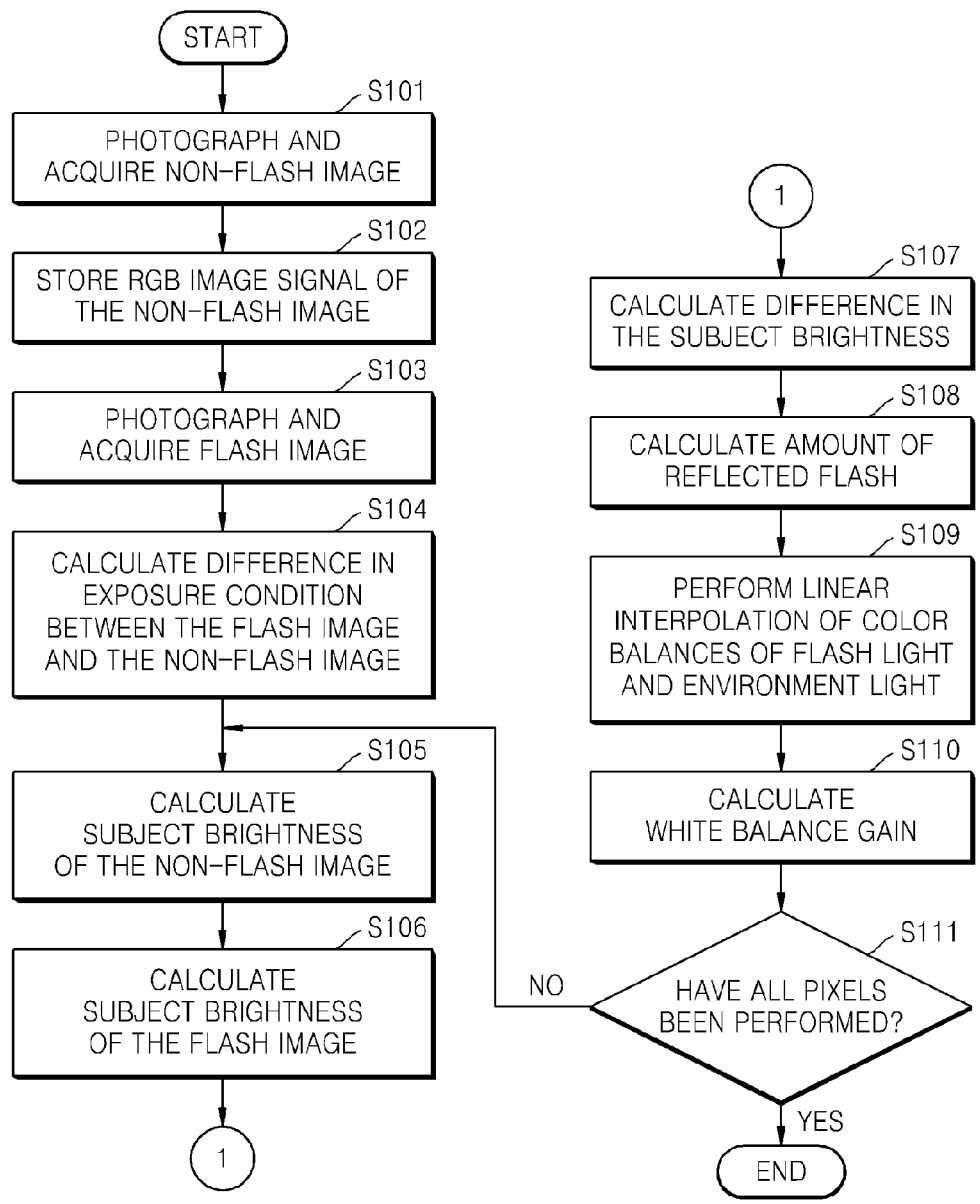
FIG. 2 is a flowchart of an operation of calculating a white balance gain of the photographing apparatus of FIG. 1, according to an exemplary embodiment of the invention.

FIG. 1 is a block diagram of a photographing apparatus 100 according to an exemplary embodiment of the invention. FIG. 2 is a flowchart of an operation of calculating a white balance gain of the photographing apparatus 100 of FIG. 1, according to an exemplary embodiment of the invention.

Referring to FIG. 1, light transmitted through a lens 102 forms an image on an image pickup device, such as a charge coupled device (CCD) image sensor 108 or a complementary metal oxide semiconductor (CMOS) image sensor. As a result, an RGB image signal is obtained from the CCD image sensor 108 by passing through a signal processing unit 110. The signal processing unit 110 performs a color separation process and analog-to-digital (A/D) conversion for a signal from the CCD image sensor 108.

Processing, such as defect pixel correction, black level correction, and shading correction, is performed by a pre-processor 112 for the RGB image signal obtained from the signal processing unit 110. The pre-processor 112 includes an automatic exposure (AE) evaluation value calculator 124 that calculates an AE evaluation value based on the RGB image signal. The AE evaluation value is provided to an appropriate AE calculator 150. When actual photographing is performed, a light-exposure controller 152 adjusts an iris 104 and a shutter 106 based on an AE value calculated by the appropriate AE calculator 150.

Various kinds of image processing, such as white balance correction processing, Bayer color interpolation (demosaicing) processing, color correction processing, edge emphasis processing, gamma correction processing, and noise reduction processing, are performed by a post-processor 114 for the RGB image signal processed by the pre-processor 112. Thereafter, the RGB image signal is converted to a YCC image signal by a YCC converter 116 and compressed into a format, such as Joint Photographic Experts Group (JPEG), by a data compressor 118. Thereafter, image data is recorded in a memory card 122 through a memory card connector 120 that is an interface.

The current embodiment has a feature of calculating a proper white balance gain in a pixel unit for a flash image acquired by photographing with light emission of a flash 160.

A photographing operation of the photographing apparatus 100 according to the current embodiment will now be described.

Photographing starts when a user pushes a shutter button. Hereinafter, a case requiring flash light according to a light-exposure condition is described. In the case requiring flash light according to a light-exposure condition, photographing is achieved once by performing non-flash photographing without light emission of the flash 160 and flash photographing with light emission of the flash 160.

Figure 5:
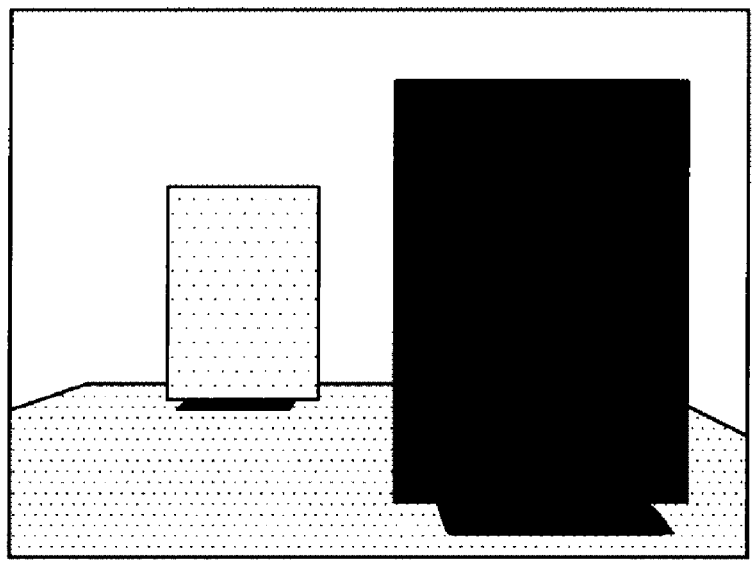
FIG. 5 is a pictorial diagram for describing an image captured by performing non-flash photographing.

First, a non-flash image is acquired by photographing without light emission of the flash 160 in operation S101. Before photographing is performed, the appropriate AE calculator 150 determines a first exposure control value that is appropriate for the environment light, such as illumination where no flash emits under the control of a sensitivity SV, a shutter speed TV, and an iris AV. Photographing is performed without light emission of the flash 160 at the determined first exposure control value (first photographing). As a result, an image shown in FIG. 5 is obtained.

An RGB image signal of the environment light before light emission of the flash 160 is obtained and stored in a first photographing memory unit 132 of an image memory 130, in operation S102.

The appropriate AE calculator 150 continuously determines a second exposure control value that is appropriate to light emission of the flash 160 and has the same iris value as that of the first exposure control value. Photographing is performed with light emission of the flash 160 at the determined second exposure control value (second photographing), in operation S103. As a result, an image shown in FIG. 4 after light emission of the flash 160 is obtained.

An RGB image signal after light emission of the flash 160 is stored in a second photographing memory unit 134 of the image memory 130.

The first photographing and the second photographing have the same iris value since an amount of image surrounding light varies according to a difference in an iris value. Using the same iris value removes a difference in an amount of light between a flash image and a non-flash image except an amount of flash light. However, the invention is not limited thereto when the amount of image surrounding light does not vary according to the difference in the iris value.

Figure 6:
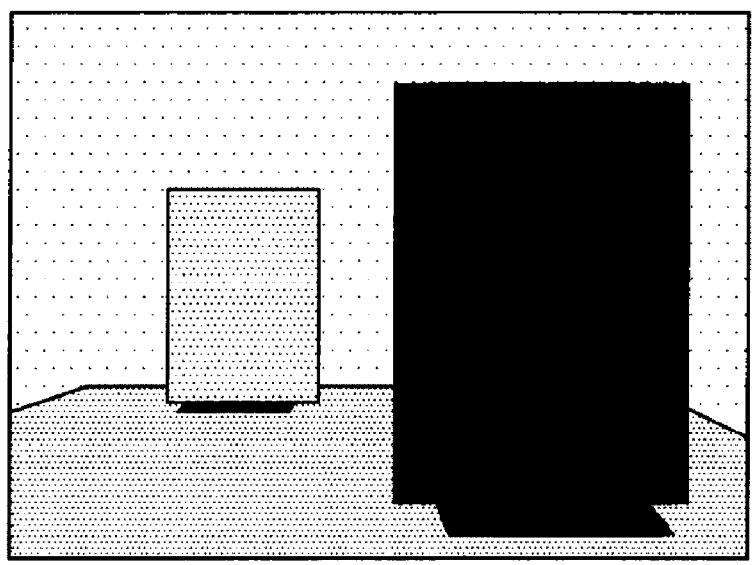
FIG. 6 is a pictorial diagram for describing an image obtained by applying a light-exposure control value difference to a non-flash image.

The first and second exposure control values follow Equation 1 below when an exposure condition is determined. Here, TV denotes a shutter speed, AV denotes an iris value, SV denotes sensitivity, and BV denotes a subject brightness value, which are represented with an APEX value. If a light-exposure control value in a case of capturing the non-flash image shown in FIG. 6 is not identical to a light-exposure control value in a case of capturing the flash image shown in FIG. 5, a difference between the light-exposure control values is considered according to Equation 1.

[Equation 1]

$$TV+AV=SV+BV \quad (1)$$

TV, AV, and SV are calculated by the appropriate AE calculator 150 and thus changed as Equation 2 below to calculate BV. A subject brightness BV is a brightness value of a subject photographed by the photographing apparatus 100.

[Equation 2]

$$BV=TV+AV-SV \quad (2)$$

A first light-exposure control value BVl as a subject brightness value BV calculated from TV, AV, and SV for the case without light emission of the flash 160, and a second light-exposure control value BVs as a subject brightness value BV calculated from TV, AV, and SV for the case with light emission of the flash 160, are obtained using Equation 2. The first light-exposure control value BVl is obtained using light-exposure control values TVl, AVl, and SVl for the non-flash image as shown in Equation 3, and the second light-exposure control value BVs is obtained using light-exposure control values TVs, AVs, and SVs for the flash image as shown in Equation 4.

[Equation 3]

$$BVl=TVl+AVl-SVl \quad (3)$$

[Equation 4]

$$BVs=TVs+AVs-SVs \quad (4)$$

An exposure control value difference calculator 141 calculates a difference BVdiff between the first exposure control value BVl and the second exposure control value BVs that is obtained from Equations 3 and 4, respectively, according to Equation 5 below, in operation S104.

[Equation 5]

$$BVdiff=BVs-BVl \quad (5)$$

The difference BVdiff is 0 when the first exposure control value BVl and the second exposure control value BVs are identical to each other.

A color balance calculator 145 of a multi automatic white balance (AWB) processor 140 calculates color balances CBer (=R/G) and CBeb (=B/G) without light emission of the flash 160, that is, a case in which only environment light is used, by multiplying each color (R, G, and B) of an RGB image signal of a non-flash image by a full screen. Simultaneously, the color balance calculator 145 reads the color balances CBfr and CBfb of a case of only flash light without environment light that are previously stored in a read only memory (ROM) as known values from the ROM.

Referring back to FIG. 1, an input value of the multi AWB processor 140 includes the RGB image signal without light emission of the flash 160 and the RGB image signal with light emission of the flash 160, and an output value of the multi AWB processor 140 is a white balance gain of all pixels. A white balance controller 126 applies a white balance gain to all pixels in a pixel unit.

Figure 3:
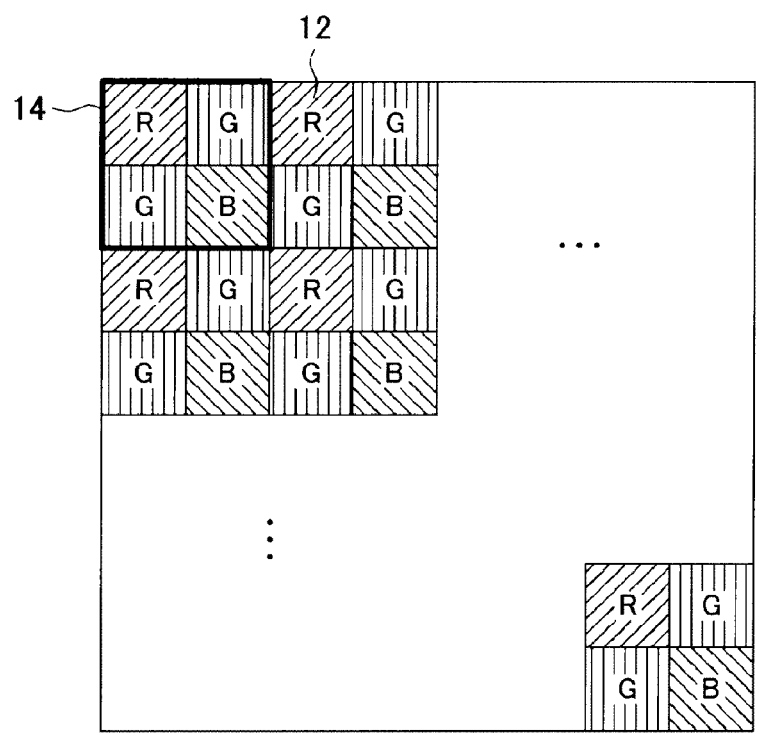
FIG. 3 is a pictorial diagram for describing a Bayer unit.

A pixel-based subject brightness is calculated based on the RGB image signal obtained without light emission of the flash 160 and the RGB image signal obtained with light emission of the flash 160, which are stored in a memory means, such as the image memory 130. The calculation of the pixel-based subject brightness is performed by considering a Bayer unit 14 in which 4 pixels 12 of R, G, G, and B are combined as 1 set as 1 pixel as shown in FIG. 3 or generating one pixel for each of color components R, G, and B from 4 pixels of R, G, G, and B in a Bayer image by Bayer color interpolation (demosaicing) processing.

A subject brightness calculator 142 calculates a subject brightness value in a pixel unit for each pixel of the non-flash image and the flash image. Calculation equations are shown below. In Equations 6 and 7, Y denotes brightness of each pixel. The brightness Y can be replaced with the signal value of G. AE is a target brightness signal value of the appropriate AE calculator 150 for calculating a light-exposure control value. According to Equations 6 and 7, a first subject brightness value BVlp of the non-flash image and a second subject brightness value BVsp of the flash image are obtained in a pixel unit, in operations S105 and S106. BVlp and BVsp denote signal values represented with a logarithm, and a unit system is based on APEX values.

[Equation 6]

$$BVlp = \log_2\left(\frac{Y}{AE}\right) \quad (6)$$

[Equation 7]

$$BVsp = \log_2\left(\frac{Y}{AE}\right) \quad (7)$$

A non-flash subject brightness difference BVlpdiff is obtained by considering the first subject brightness value BVlp of the non-flash image in a pixel unit and the difference BVdiff between the light-exposure control values, in operation S107. An image is obtained as shown in FIG. 6 by applying Equation 8 below to the non-flash image photographed at appropriate exposure of FIG. 5.

[Equation 8]

$$BVlp\text{diff} = BVlp - BV\text{diff} \quad (8)$$

A subject brightness difference calculator 143 calculates a flash image subject brightness difference BVdiffp between the second subject brightness value BVsp of the flash image and the non-flash subject brightness difference BVlpdiff in a pixel unit according to Equation 9 below, in operation S107.

[Equation 9]

$$BV\text{diffp} = BVsp - BVlp\text{diff} \quad (9)$$

Figure 7A:
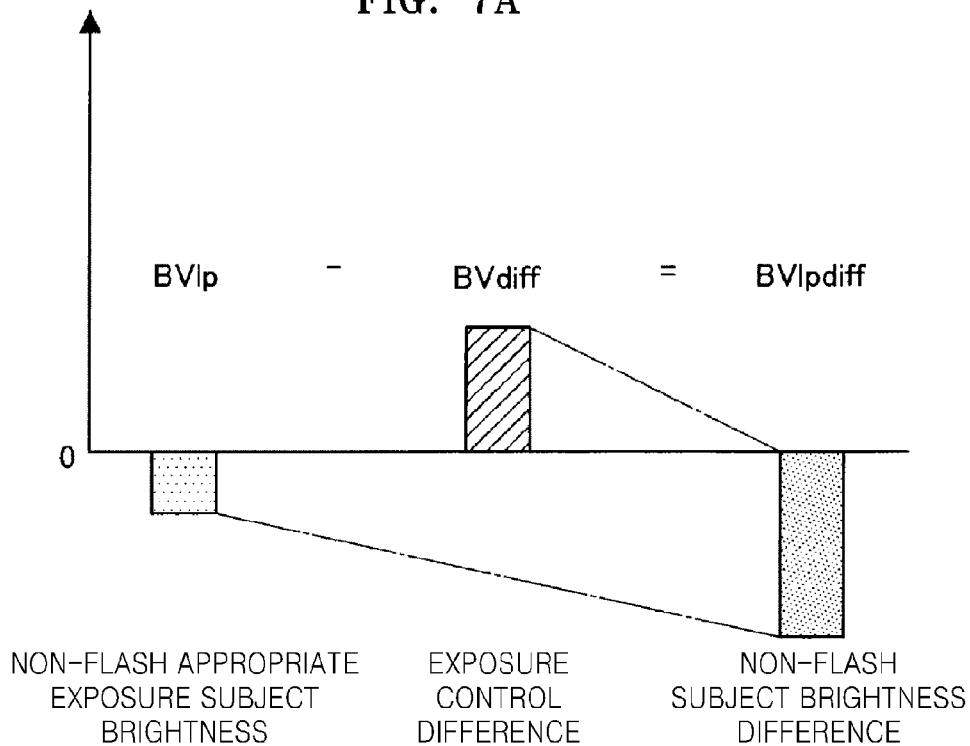
FIGS. 7A and 7B are graphs for describing a concept of calculating a subject brightness difference, according to an exemplary embodiment of the invention.
Figure 7B:
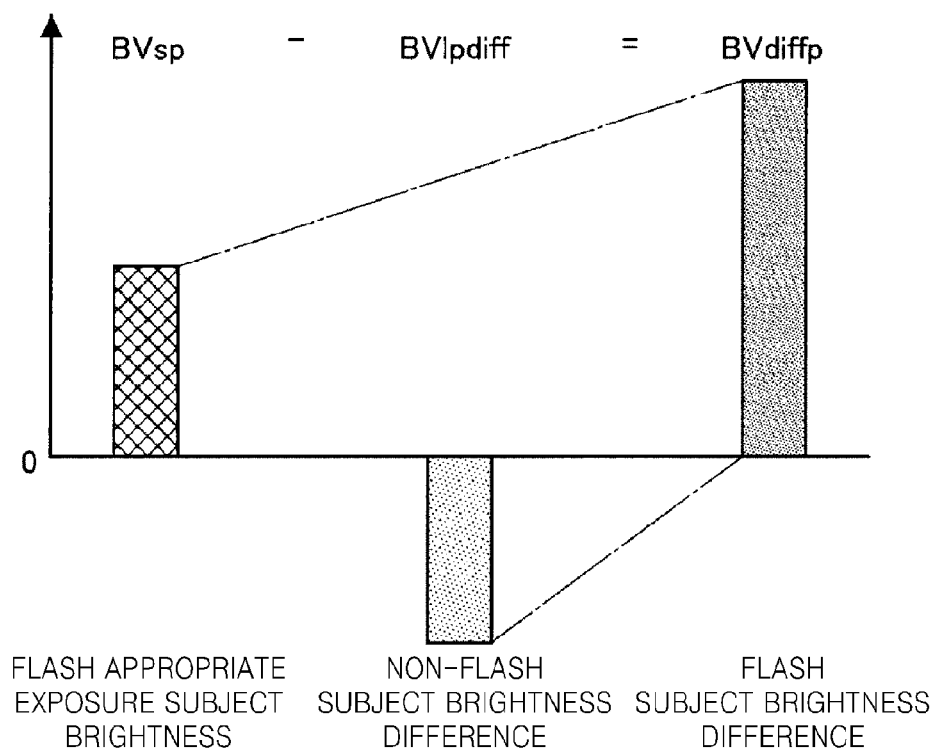

FIGS. 7A through 9B are conceptual diagrams of Equations 8 and 9. Referring to FIGS. 7A and 7B, a subject is not exposed to environment light and is exposed to flash light at a position A of FIG. 4 in which the flash image subject brightness difference BVdiffp in a pixel unit is high and thus there is a large amount of reflected flash.

Figure 4:
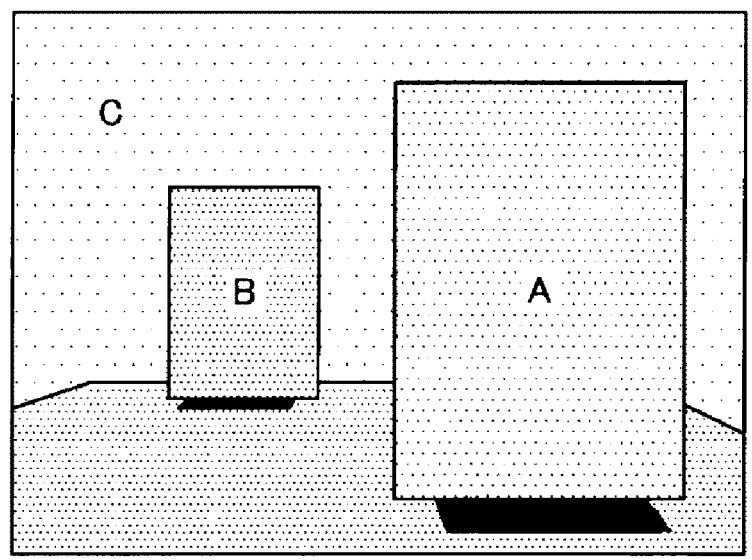
FIG. 4 is a pictorial diagram for describing an image captured by performing flash photographing.
Figure 8A:
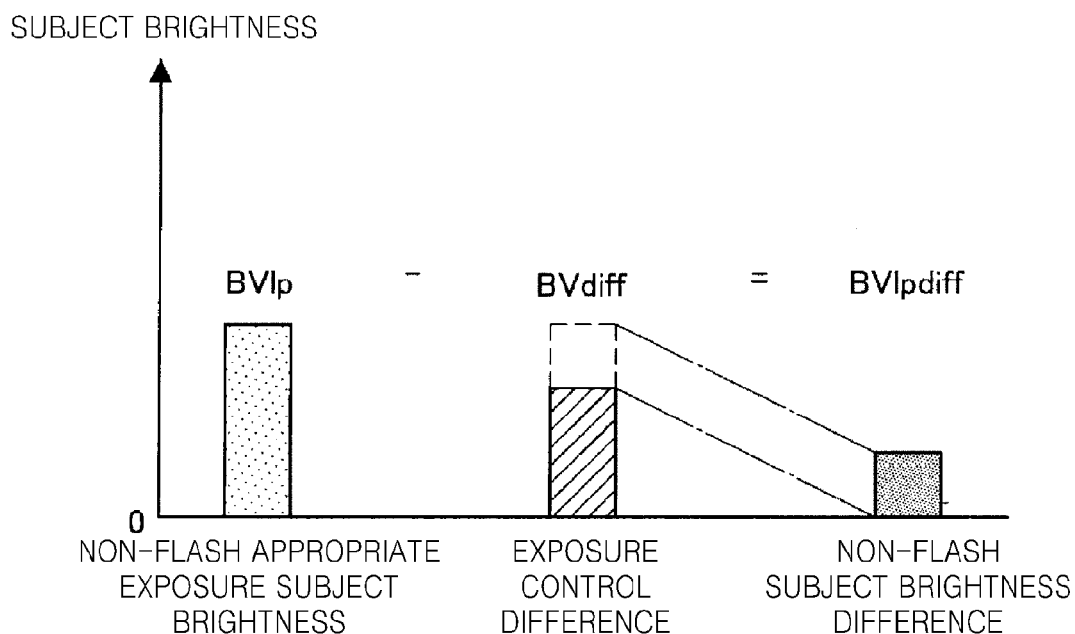
FIGS. 8A and 8B are graphs for describing a concept of calculating a subject brightness difference, according to another exemplary embodiment of the invention.
Figure 8B:
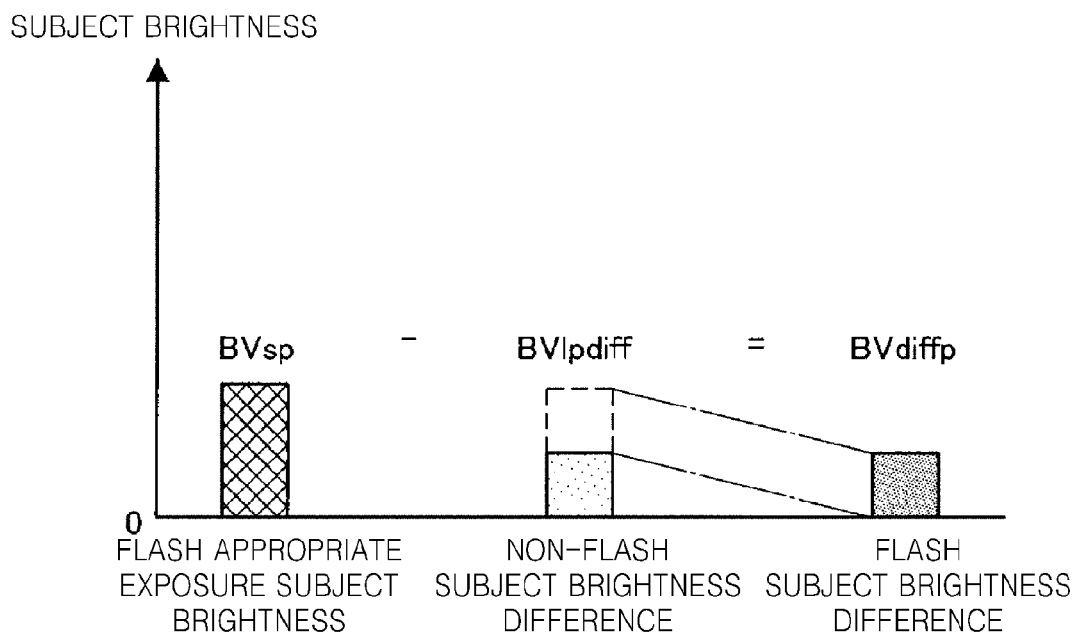

Likewise, referring to FIGS. 8A and 8B, a subject is exposed to flash light and environment light at a position B of FIG. 4 in which the flash image subject brightness difference BVdiffp in a pixel unit is not high and thus there is little amount of reflected flash.

Figure 9A:
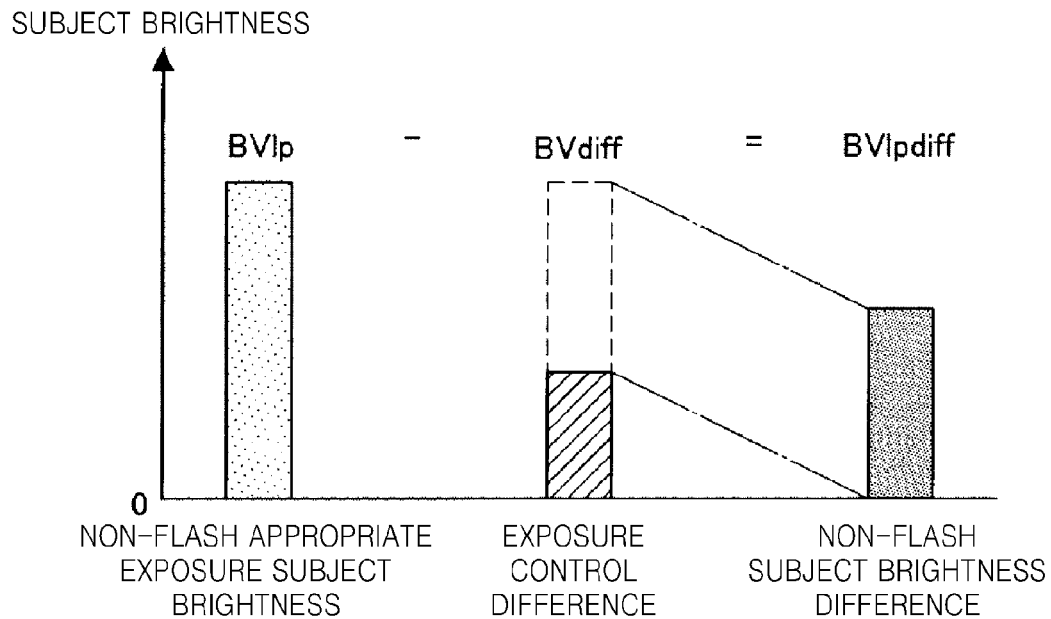
FIGS. 9A and 9B are graphs for describing a concept of calculating a subject brightness difference, according to another exemplary embodiment of the invention.
Figure 9B:
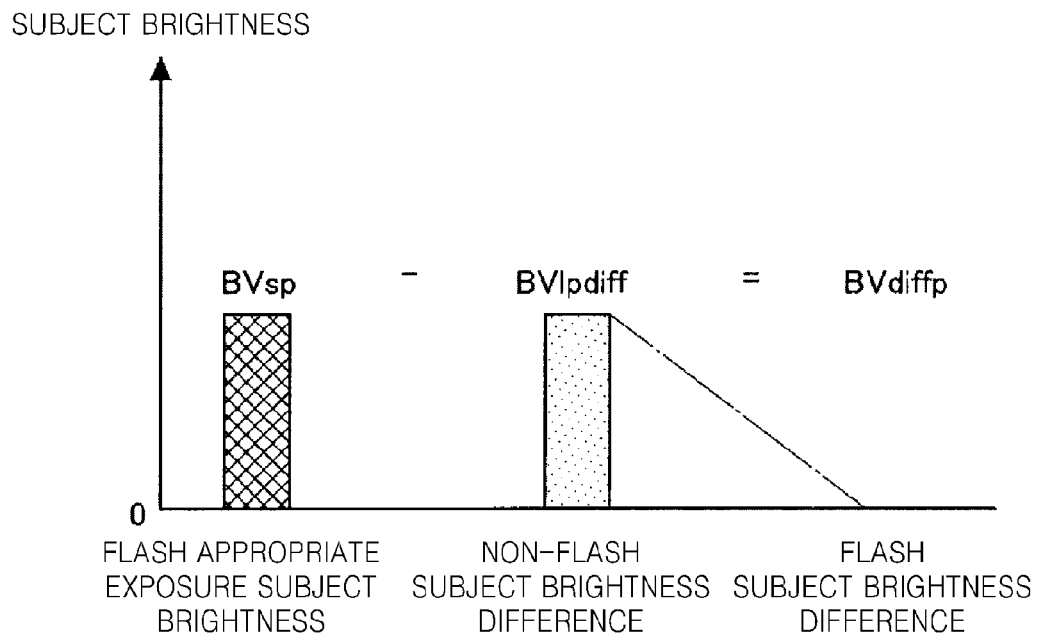

Referring to FIGS. 9A and 9B, a subject is exposed to environment light, i.e., a subject is not exposed to flash light, at a position C of FIG. 4 in which the flash image subject brightness difference BVdiffp in a pixel unit is 0 that means that the subject is exposed to no flash.

A flash reflection intensity calculator 144 obtains an amount of reflected flash of each pixel from the flash image subject brightness difference BVdiffp obtained using Equation 9, in operation S108. A light amount Lf of the flash image is obtained using Equation 10 below.

[Equation 10]

$$Lf = 2^{BV\text{diffp}} \quad (10)$$

An amount of reflected flash Ratio of each pixel is obtained from the light amount Lf of the flash image according to Equation 11 below when an amount of environment light of the non-flash image is 1.

[Equation 11]

$$\text{Ratio} = \frac{(Lf - 1)}{Lf} \quad (11)$$

A color balance calculator 145 obtains a color balance CB of a target pixel by performing linear interpolation of the color balance CBf of the flash light and the color balance CBe of the environment light based on the amount of reflected flash Ratio of each pixel, in operation S109. The color balance CB is independently obtained for R and B.

[Equation 12]

$$CBr = (\text{Ratio} * CBfr) + ((1 - \text{Ratio}) * CBer)$$

$$CBb = (\text{Ratio} * CBfb) + ((1 - \text{Ratio}) * CBeb) \quad (12)$$

A white balance gain calculator 146 calculates white balance gains WBGainR and WBGainB of a target pixel according to Equation 13 from the color balance CB of R and B obtained from Equation 12, in operation S110.

[Equation 13]

$$WBGainR = \frac{1}{CBr}$$

$$WBGainB = \frac{1}{CBb} \quad (13)$$

Equations 3 and 13 are applied to all pixels, in operation S111. Accordingly, even if an exposure control value of a non-flash image is different from an exposure control value of a flash image, an appropriate white balance gain can be obtained in a pixel unit for a scene in which flash light and environment light are mixed.

After calculating white balance gains of all pixels, the white balance controller 126 may perform appropriate white balance processing by applying a white balance gain to a corresponding pixel of the flash image.

Although conventionally a non-flash image was not appropriately exposed, a difference in an exposure control value between a non-flash image of appropriate image and a flash image is calculated in the present embodiment, thereby calculating an appropriate white balance gain in a pixel unit for a scene of the flash image in which flash light and environment light are mixed.

Further, since a non-flash image is appropriately exposed, an incongruity is removed from the non-flash image, and thus the non-flash image can be used as a live view image. More specifically, when the non-flash image is used as the live view image, referring to FIG. 10, it is unnecessary for changing an exposure condition for reading the live view image and exposing the live view image. As a result, flash photographing can be performed right after non-flash photographing is performed, thereby removing a release time lag between a shutter and obtaining of an image.

Figure 10:
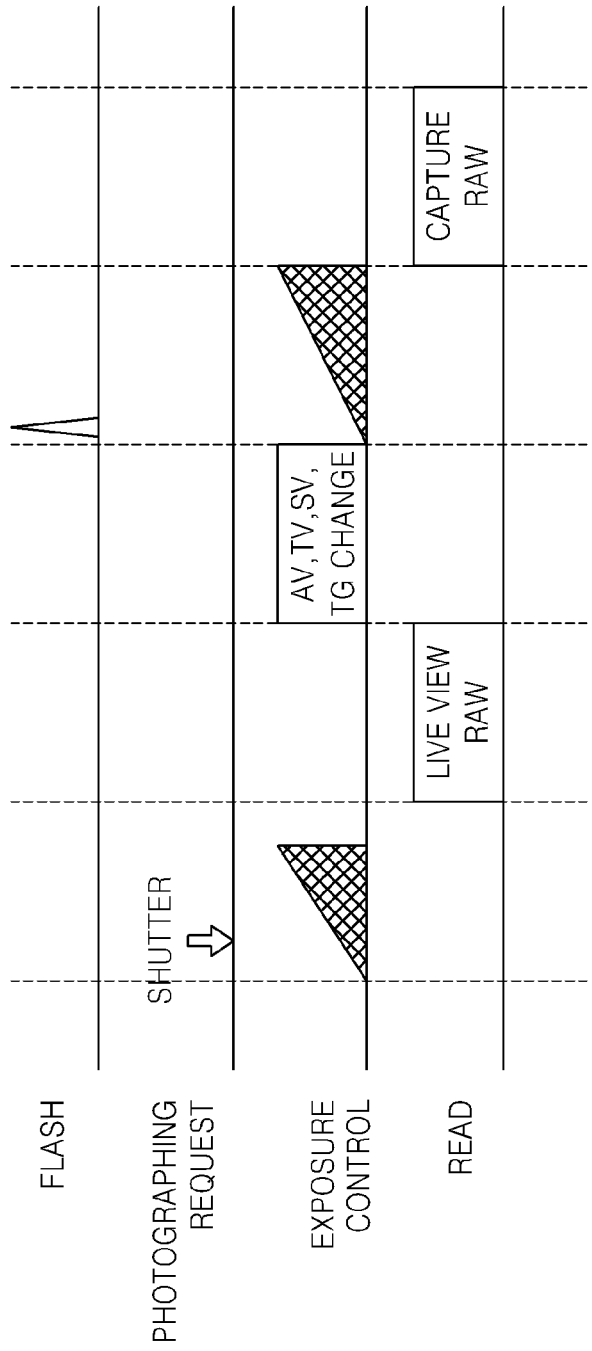
FIG. 10 is a timing diagram of a photographing operation of a photographing apparatus, according to another exemplary embodiment of the invention.
Figure 11:
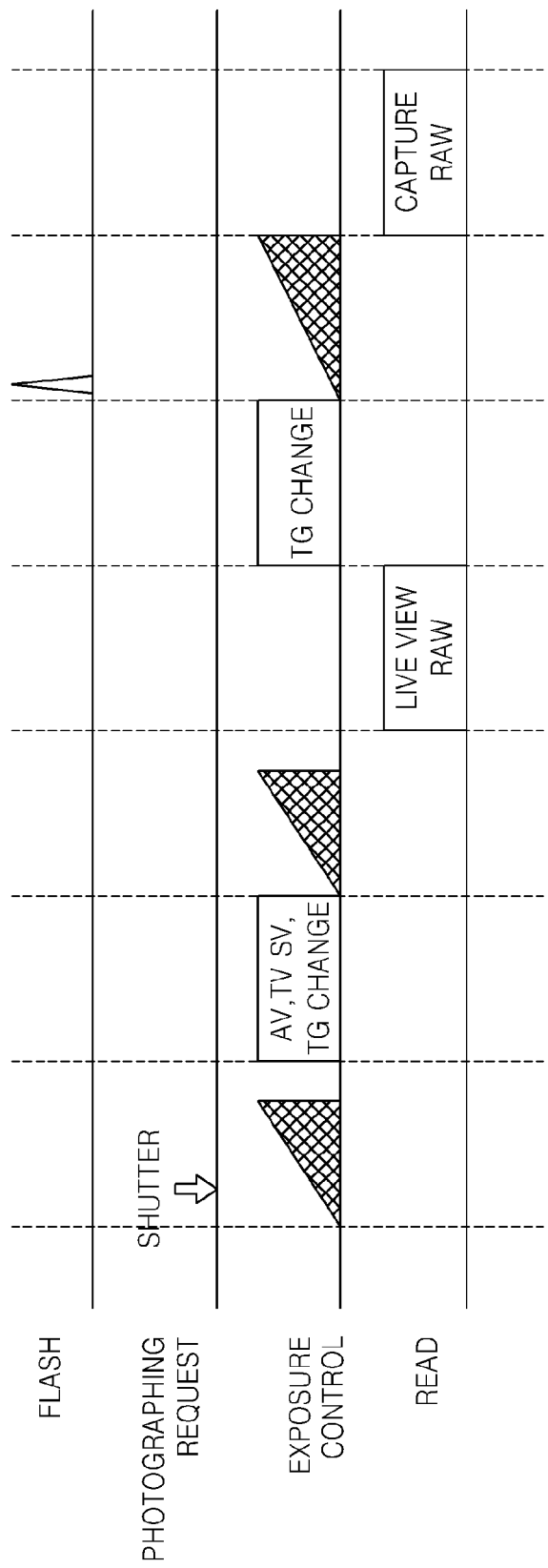
FIG. 11 is a timing diagram of a photographing operation of a conventional photographing apparatus.

Although conventionally it is necessary for changing an exposure condition for reading a live view image and exposing the live view image after non-flash photographing is performed as illustrated in FIG. 11, since a time chart illustrated in FIG. 10 is applied to a photographing apparatus of the invention when a non-flash image is a live view image, the photographing apparatus of the invention can reduce time by two frames compared to the conventional photographing apparatus shown in FIG. 11.

Furthermore, when the non-flash image is a capture image, the photographing apparatus of the invention can record the capture image that cannot be conventionally used due to no appropriate exposure, thereby realizing two photographing modes of a flash photographing mode and a non-flash photographing mode along with a corrected flash image.

The device described herein may comprise a processor, a memory for storing program data and executing it, a permanent storage such as a disk drive, a communications port for handling communications with external devices, and user interface devices, including a display, keys, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". It will be recognized that the terms "comprising," "including," and "having," as used herein, are specifically intended to be read as open-ended terms of art.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention.

A photographing apparatus according to an embodiment of the invention can properly white-balancing an entire flash image without performing an unnecessary photographing operation by using a non-flash image as an image of appropriate exposure, so as to compare the flash image and the non-flash image in a pixel unit, obtain an amount of reflected flash light, and calculate an appropriate white balance gain in a pixel.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A photographing apparatus comprising:
an exposure control value calculator for calculating a first exposure control value for a first image obtained by performing non-flash photographing and a second exposure control value for a second image by performing flash photographing based on light received from a subject;
a photographing unit for acquiring the first image by performing photographing based on the first exposure control value and for acquiring the second image by performing photographing based on the second exposure control value;
an exposure control value difference calculator for calculating an exposure control value difference that is a difference between the first exposure control value and the second exposure control value;
a subject brightness calculator for calculating a first subject brightness of the first image and for calculating a second subject brightness of the second image;
a subject brightness difference calculator for calculating a subject brightness difference by using the exposure control value difference, the first subject brightness, and the second subject brightness;
a reflected flash amount calculator for calculating an amount of reflected flash from the subject brightness difference; and
a white balance gain calculator for calculating a white balance gain from the amount of reflected flash.

2. The photographing apparatus of claim 1, further comprising: a white balance controller for controlling a white balance in a pixel unit by applying the white balance gain to all pixels of the second image in a pixel unit.

3. The photographing apparatus of claim 1, wherein the first exposure control value and the second exposure control value are independently calculated by the exposure control value calculator and are identical to each other.

4. The photographing apparatus of claim 1, wherein the first exposure control value and the second exposure control value are independently calculated by the exposure control value calculator and are different from each other.

5. The photographing apparatus of claim 1, wherein the photographing unit acquires the second image by using the second exposure control value having a same iris value as an iris value of the first exposure control value calculated by the exposure control value calculator.

6. The photographing apparatus of claim 1, further comprising: a color balance calculator for calculating a color balance of a target pixel by linearly-interpolating a color balance with respect to environment light and a color balance with respect to flash light based on the amount of reflected flash calculated by the reflected flash amount calculator,
wherein the white balance gain calculator calculates the white balance gain based on the color balances.

7. The photographing apparatus of claim 1, wherein the first exposure control value is used to make brightness of the first image appropriate, and the second exposure control value is used to make brightness of the second image appropriate.

8. The photographing apparatus of claim 1, wherein the subject brightness calculator calculates a first subject brightness for all pixels of the first image and calculates a second subject brightness for all pixels of the second image, and
wherein the subject brightness difference calculator calculates a subject brightness difference that is a difference between the exposure control value difference, the first subject brightness per pixel, and the second subject brightness per pixel, for all pixels.

9. The photographing apparatus of claim 8, wherein the reflected flash amount calculator calculates the amount of reflected flash in a pixel unit from the subject brightness difference, and
wherein the white balance gain calculator calculates the white balance gain in a pixel unit from the amount of reflected flash.

10. A photographing method comprising:
calculating a first exposure control value for a first image obtained by performing non-flash photographing and a second exposure control value for a second image by performing flash photographing based on light received from a subject;
acquiring the first image by performing photographing based on the first exposure control value and acquiring the second image by performing photographing based on the second exposure control value;
calculating an exposure control value difference that is a difference between the first exposure control value and the second exposure control value;
calculating a first subject brightness of the first image and calculating a second subject brightness of the second image;
calculating a subject brightness difference by using the exposure control value difference, the first subject brightness, and the second subject brightness;
calculating an amount of reflected flash from the subject brightness difference; and
calculating a white balance gain from the amount of reflected flash.

11. The photographing method of claim 10, further comprising: controlling a white balance in a pixel unit by applying the white balance gain to all pixels of the second image in a pixel unit.

12. The photographing method of claim 10, wherein the calculating of the first subject brightness comprises: calculating a first subject brightness for the entire pixels of the first image and calculating a second subject brightness for all pixels of the second image, and
wherein the calculating of the subject brightness difference comprises: calculating a subject brightness difference that is a difference between the exposure control value difference, the first subject brightness per pixel, and the second subject brightness per pixel, for all pixels.

13. The photographing method of claim 12, wherein the calculating of the amount of reflected flash comprises: calculating the amount of reflected flash in a pixel unit from the subject brightness difference, and
wherein the calculating of the white balance gain comprises: calculating the white balance gain in a pixel unit from the amount of reflected flash.

14. The photographing method of claim 10, further comprising:
linearly-interpolating a color balance of environment light and a color balance of flash light based on the amount of reflected flash calculated by the reflected flash amount calculator; and
calculating a color balance of a target pixel.

15. A non-transitory computer readable recording medium that stores a program comprising program instructions for executing on a processor a photographing method comprising:
calculating a first exposure control value for a first image obtained by performing non-flash photographing and a second exposure control value for a second image by performing flash photographing based on light received from a subject;
acquiring the first image by performing photographing based on the first exposure control value and acquiring the second image by performing photographing based on the second exposure control value;
calculating an exposure control value difference that is a difference between the first exposure control value and the second exposure control value;
calculating a first subject brightness of the first image and calculating a second subject brightness of the second image;
calculating a subject brightness difference by using the exposure control value difference, the first subject brightness, and the second subject brightness;
calculating an amount of reflected flash from the subject brightness difference; and calculating a white balance gain from the amount of reflected flash.

* * * * *